United States Patent
Le Fort

[15] 3,653,032

[45] Mar. 28, 1972

[54] COMPRESSING CONVERTER FOR TRANSLATING ANALOG SIGNAL SAMPLES INTO PULSE CODE MODULATION SIGNALS

[72] Inventor: Gilbert J. Le Fort, 28 Residence Corlay, Lannion, France

[22] Filed: Oct. 20, 1970

[21] Appl. No.: 82,420

[30] Foreign Application Priority Data

Oct. 29, 1969 France ................................6937201

[52] U.S. Cl. ....................................................340/347 AD

[51] Int. Cl. ....................................................H03k 13/06

[58] Field of Search ..........................................340/347 AD

[56] References Cited

UNITED STATES PATENTS

| | | | |
|---|---|---|---|
| 3,467,958 | 8/1969 | McKinney | 340/347 AD |
| 3,495,233 | 2/1970 | Saari | 340/347 AD |
| 3,444,550 | 5/1969 | Paulus | 340/347 AD |

*Primary Examiner*—Maynard R. Wilbur
*Assistant Examiner*—Robert F. Gnuse
*Attorney*—Abraham A. Saffitz

[57] ABSTRACT

A device for converting analog signal samples into PCM signals, comprising means for successively comparing to a predetermined reference voltage the amplitude of each sample and the successive products thereof by increasing powers of two. At each comparison showing said amplitude of one of said products to be smaller than said reference voltage, a binary digit of a given signalling condition is generated, while a binary digit of the other signalling condition is generated as soon as a comparison shows one of said products to exceed said reference voltage. A remainder signal derived from the latter comparison is transmitted to a linear PCM coder, which delivers a first sequence of PCM signals, while a computer translates the sequence formed by the above-said digits into a second sequence of PCM signals. The assembly of both sequences constitutes the ready-to-be-transmitted PCM signal groups. The device is further characterized in that it makes use, for the successive comparisons, of a plurality of cascaded circuits, each of which includes a difference amplifier with two negative feedback paths, one including a diode having its conduction direction from the output to the input of the amplifier and series connected with a resistance, and the other including a diode having the reverse conduction direction and series-connected with another resistance equal to half or twice the preceding one according to the even or odd rank of the amplifier in the cascade. Thanks to this arrangement, the difference signal resulting from each comparison is multiplied by 1 or 2 according to its polarity, this allowing to use a common reference voltage for all stages of the cascade.

3 Claims, 8 Drawing Figures

INVENTOR:
Gilbert J. LE FORT
By Abraham A. Saffitz
ATTORNEY

INVENTOR:
Gilbert J. LE FORT
By Abraham A. Saffitz
ATTORNEY

INVENTOR:
Gilbert J. LE FORT
By Abraham A. Saffitz
ATTORNEY

INVENTOR:
Gilbert J. LE FORT
By Abraham A. Saffitz
ATTORNEY

INVENTOR:
Gilbert J. LE FORT
By Abraham A. Saffitz
ATTORNEY

COMPRESSING CONVERTER FOR TRANSLATING ANALOG SIGNAL SAMPLES INTO PULSE CODE MODULATION SIGNALS

This invention relates in general to PCM (pulse code modulation) communication systems, more particularly to converters for translating repetitious amplitude samples of analog signals into coded groups of binary digits, the encoding being accompanied by amplitude compression of the sample.

More particularly, the encoder according to the invention belongs to that category of compression encoders in which the sample is first translated without compression into a first group of binary digits whose value is expressed in one particular code, whereafter the first group of binary digits is translated in a system of logic circuits into a second group of binary digits expressing the binary-code value of the sample.

The normally used compression pattern in connection with the translation of analog signals into PCM signals is given by:

$$y = \log_e (1 + \mu x)/\log_e (1 + \mu) \quad (1)$$

in which $y = p/N$ and $x = V_p/V_{max}$; $p$ denotes the quantized level rank counted in the sense of increasing amplitude; $N = 2^n$ the total number of quantized levels; $V_p$ denotes that value of the amplitude of the sample to be encoded which is applied to the encoder input for the level of rank $p$; $V_{max}$ denotes the maximum voltage which the encoder can process; and $\mu$ denotes a dimensionless parameter with an optimum value of 100. The encoder according to the invention keeps approximately to thie pattern in that the quantification level width $\Delta x$ corresponding to a constant height $\Delta y = 1$ of the step does not vary continuously with $x$ but remains constant over certain ranges of $x$. The principle underlying this kind of encoding is described in detail in Robert Mauduech's French Pat. specification No. 1,593,017 of 11 Sept. 1968.

The transmission code used is a seven-digit binary code in which the first digit S denotes the sign, the next three digits *ABC* denote the binary number of one range of amplitudes of a total of eight, in which range the width of the quantized levels is constant, and the last three digits *XYZ* denote the binary number of the quantized level in the range. The part ABC corresponds to a nonlinear encoding and the part *XYZ* corresponds to a linear encoding. •

Leaving aside the binary sign digit, the encoding table is as follows:

TABLE I

| XYZ / ABC | 000 | 001 | 010 | 011 | 100 | 101 | 110 | 111 |
|---|---|---|---|---|---|---|---|---|
| 000 | 0 | 1 | 2 | 3 | 4 | 5 | 6 | 7 |
| 001 | 8 | 9 | 10 | 11 | 12 | 13 | 14 | 15 |
| 010 | 16 | 18 | 20 | 22 | 24 | 26 | 28 | 30 |
| 011 | 32 | 36 | 40 | 44 | 48 | 52 | 56 | 60 |
| 100 | 64 | 72 | 80 | 88 | 96 | 104 | 112 | 120 |
| 101 | 128 | 144 | 160 | 176 | 192 | 208 | 224 | 240 |
| 110 | 256 | 288 | 320 | 352 | 384 | 416 | 448 | 480 |
| 111 | 512 | 576 | 640 | 704 | 768 | 832 | 896 | 960 |

The Table shows that the value of the quantized level in the range and the width of the range increase as powers of two except for the first line corresponding to $ABC = 0$.

The encoder first translates the sample into a number containing eleven binary digits $d_1$, $d_2$,...$d_{11}$, of which the first digit $d_1$ is equal to the binary sign digit, the next seven digits $d_2$ to $d_8$ are expressed in the particular code hereinbefore mentioned and are correlated to the three binary digits ABC, and the last three $d_9$, $d_{10}$, $d_{11}$ are expressed in the Gray code, also known as the reflected binary code, and are correlated to the three binary digits *XYZ*.

The code for expressing the number ($d_2$, $d_3$,...$d_8$) is a code in which the 0's and 1's can never be interlaced and in which the number of different 1's in the encoded group is equal to the decimal number equal to *ABC*. For instance, if $ABC = 111 = 7$, then:

$d_2 d_3 d_4 d_5 d_6 d_7 d_8 = 1111111$ - *i.e.*, the encoded group contains seven 1's. Again, for instance, if $d_2 d_3 d_4 d_5 d_6 d_7\ d_8 = 0000000$, then $ABC = 0$. The following table II shows the correspondence between the ($d_2$ to $d_8$) and the ABC codes:

TABLE II

| $d_2$ | $d_3$ | $d_4$ | $d_5$ | $d_6$ | $d_7$ | $d_8$ | A | B | C |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 1 | 0 | 0 | 1 |
| 0 | 0 | 0 | 0 | 0 | 1 | 1 | 0 | 1 | 0 |
| 0 | 0 | 0 | 0 | 1 | 1 | 1 | 0 | 1 | 1 |
| 0 | 0 | 0 | 1 | 1 | 1 | 1 | 1 | 0 | 0 |
| 0 | 0 | 1 | 1 | 1 | 1 | 1 | 1 | 0 | 1 |
| 0 | 1 | 1 | 1 | 1 | 1 | 1 | 1 | 1 | 0 |
| 1 | 1 | 1 | 1 | 1 | 1 | 1 | 1 | 1 | 1 |

Hence:

$$A = d_5$$
$$B = d_3 + d_7\ \bar{d}_5 \quad (3)$$
$$C = d_2 + \bar{d}_3\ d_4 + \bar{d}_5\ d_6 + \bar{d}_7\ d_8.$$

As previously stated, the number ($d_9$, $d_{10}$, $d_{11}$) is expressed in the Gray code, the translation table being as follows:

$$X = d_9$$
$$Y = d_9\ \bar{d}_{10} + \bar{d}_9\ d_{10} \quad (4)$$
$$Z = Y\bar{d}_{11} + \bar{Y} d_{11}.$$

Since the binary digits $d_2$ to $d_{11}$ are produced by means of the actual encoder, the system of logic circuits deduces *A*, *B*, *C*, *X*, *Y*, *Z*; *S* is equal to $d_1$.

The encoder comprises elementary translators known in the prior art. An elementary translator is a circuit having one analog input and three outputs, one of which is digital and the other two of which are analog. According as the input signal is negative or positive, the signal at the first output is a digital signal of one or the other polarity. When the input signal varies from negative to positive, the signal at the second output is to start with proportional to the input signal in the negative part thereof, then 0 in the positive part of the input signal, and the signal at the third output is 0 to start with the negative part of the input signal, then proportional thereto in the positive part thereof. If a substraction of the signals of the two analog outputs is made, the transfer characteristic -i.e., the relationship between the amplitude of the input signal on the abscissa and the amplitude of the output signal on the ordinate - has the shape of a V whose apex is at the origin and whose bisector is the axis of the output signals. If a reference signal is added to the input, the apex of the V can be shifted along the output signal axis. Circuits of this kind are known in the prior art and are described e.g., in U.S. Pat. specification No. 3,145,377 of 18 Aug. 1964 and French Pat. specification No. 1,367,773 of 2 July, 1963. Their construction will be recalled in detail hereinafter.

These translator circuits can compare an analog sample voltage or input voltage with a reference voltage and produce a signal when the input voltage is greater than the reference voltage, giving 0 signal when the input voltage is smaller than the reference voltage (or vice versa). They also make it possible to produce a remainder voltage equal to the reference voltage less one or more times the input voltage.

The input voltage is therefore compared *seriatim* with reference voltages 8, 16, 32, 64, 128, 256, 512 in translator stages. The translator outputs a 1 or a 0 (or vice versa) according as the input voltage is above or below the translator reference voltage, so that the digits $d_2$ to $d_8$ are produced consecutively. If the input voltage is below the reference voltage, a further comparison is made, this time between the same reference voltage and twice the sample; a remainder is transmitted to the next stage and no remainder is transmitted to the linear encoder supplying ($d_9 d_{10} d_{11}$). If the input voltage is above the reference voltage, no remainder goes to the next stage and a remainder goes to the linear encoder outputting ($d_9 d_{10} d_{11}$).

For instance, if the sample has the value 88, it is compared with 512; since the sample is smaller than 512, $d_2 = 0$ is deduced and −2(512−88) — i.e., 2 × 88 — is then compared with 512; since the answer is smaller than 512, $d_3$ is taken to be 0, 2(512 −2 (512−88)) is transmitted to the next stage and nothing is transmitted to the linear encoder. This term is compared with −512, which comes to comparing 4 × 88 with 512. Since it is smaller, $d_4$ is taken to be 0, and in the next stage 8 × 88 is larger than 512, $d_5$ is taken to be 1; nothing goes to the next stage and (512−8×88) goes to the linear encoder.

As a result of the encoding procedure described, all translators have the same either positive or negative reference voltage - a considerable simplification - and the remainder for linear encoding always goes to the linear encoder with constant levels, whatever the amplitude range in which any remainder has been found. This constant level is the level of the amplitude range $ABC$ = 111 and has a value of 64 units; in the example given the remainder for linear encoding is found in the amplitude range $ABC$ = 100 in which the level has a value of 8 units, but it is transmitted multiplied by 8; this latter feature makes it possible to add the remainders and give them a single linear encoding.

The invention will now be described in detail with reference to the accompanying drawings, wherein.

Figure 1:
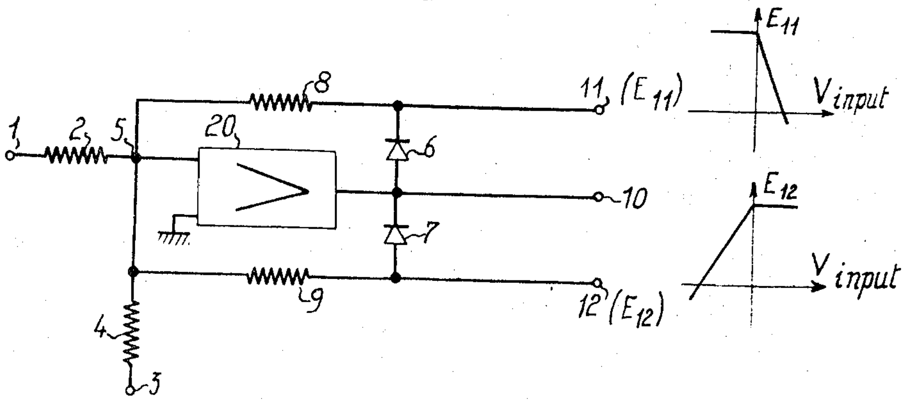
FIG. 1 shows an elementary prior art translator, illustrating how it has been modified for the purposes of this invention.

A modified prior art translator circuit is shown in FIG. 1, where there can be seen an operational amplifier 20 having a high input impedance, a low output impedance and a high voltage gain and a high current gain. The voltage at input terminal 5 of amplifier 20 is therefore substantially ground potential. The noninverting amplifier input is grounded and the inverting input 5 is connected to the analog signal input terminal via a resistance 2 and to a terminal 3 which receives a reference current via a resistance 4. The reference current determines the reference voltage at which the comparison is made. The amplifier has two negative feedback paths, the first path comprising a diode 6 and resistance 8 and the second path comprising a diode 7 and resistance 9. The diodes 6 and 7 are connected the opposite way round in their respective negative feedback paths.

The translator circuit has three output terminals 10–12. Terminal 10 is the digital output which outputs the required binary digit $d_i$. Terminals 11 and 12 deliver the remainders which go either to the next stage or to the linear encoder. In the prior art elementary translators the remainder was equal to the reference voltage serving for the comparison, less half the input voltage, as a result of an appropriate choice of relationship between the joint value of the resistances 8, 9 and the value of the resistance 2, the latter being twice the former.

In translators according to the invention, there are two remainders, one of which is equal to the reference voltage less the input voltage and the other of which is equal to twice the reference voltage less the input voltage. This is achieved by taking:

$$\frac{\text{Value of 9}}{\text{Value of 2}}=\frac{R_9}{R_2}=1 \text{ and } \frac{\text{Value of 8}}{\text{Value of 2}}=\frac{R_8}{R_2}=2$$

$$\frac{\text{Value of 8}}{\text{Value of 2}}=\frac{R_8}{R_2}=2 \text{ and } \frac{\text{Value of 9}}{\text{Value of 2}}=\frac{R_9}{R_2}=1$$

or depending upon which terminal, 11 or 12, it is desired to connect to the next stage and the the linear encoder, i.e., depending upon the polarities of the signals delivered at these terminals.

When the current at input 1 is greater than the current at input 3, the total input current is positive and the voltage at output 10 is negative. Diode 6 is biased backwards. Consequently, no current flows through resistance 8 and the output voltage at 11 is equal to the input voltage - i.e., 0. If the current at the input 1 is smaller than the current at the input 3, the total input current is negative and the voltage at output 10 is positive. Diode 6 is biased forwards and the output terminal 11 goes positive. The value of the voltage thereat is $-2(V_{reference} - V_{input})$ if $R_8 = 2R_2$, or $V_{reference} - V_{input}$ if $R_8 = R_2$. This is the voltage shown beside terminal 11 in FIG. 1. The nature of the voltage $E_{12}$ shown beside terminal 12 can be worked out in the same way. The curves representing voltages $E_{11}$, $E_{12}$ together form a V having one steep side (slope 2) and another less steep side (slope 1).

Figure 2A:
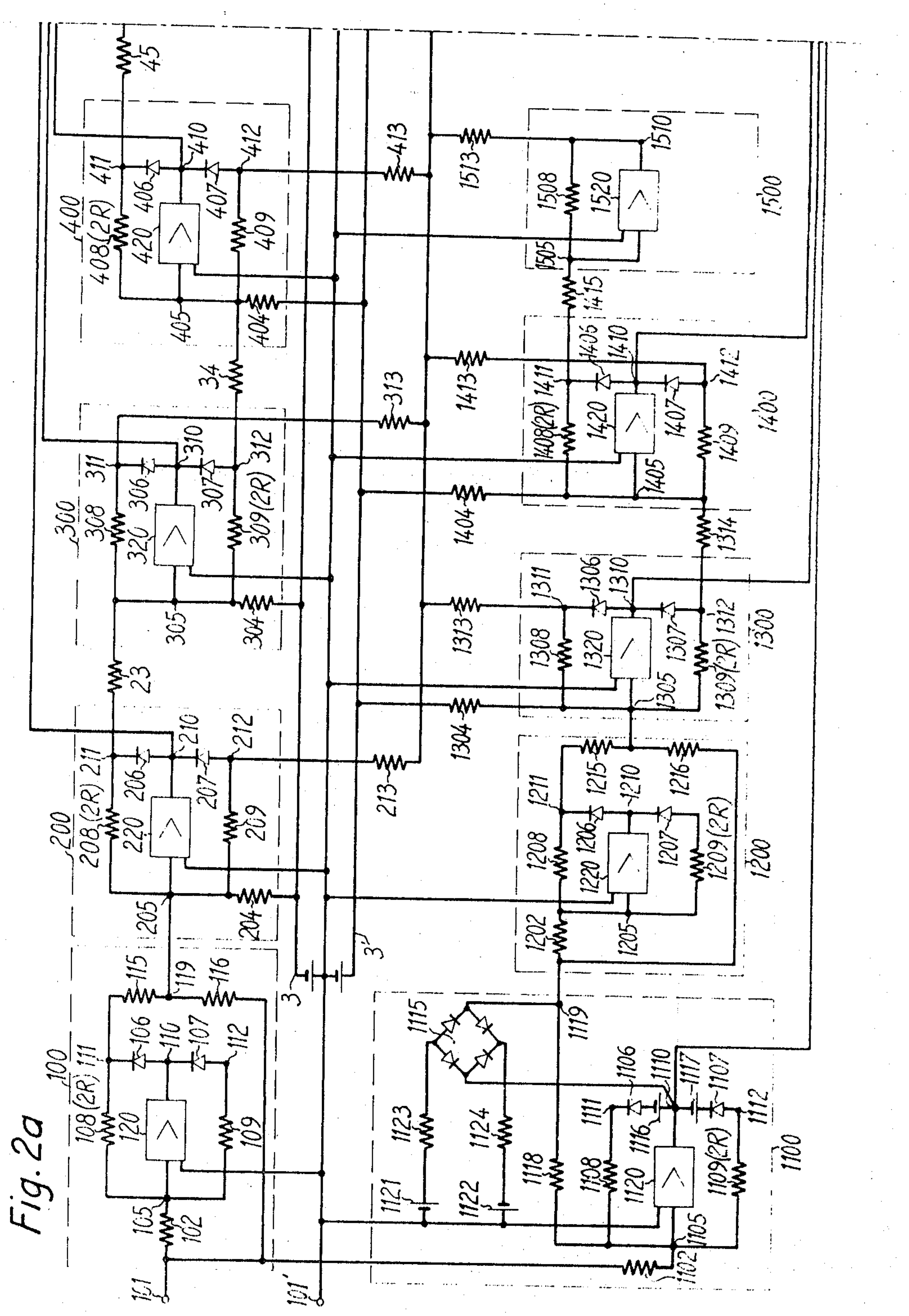
FIGS. 2A and 2B show the encoder according to the invention, the computer part being shown in block diagrammatic form.
Figure 2B:
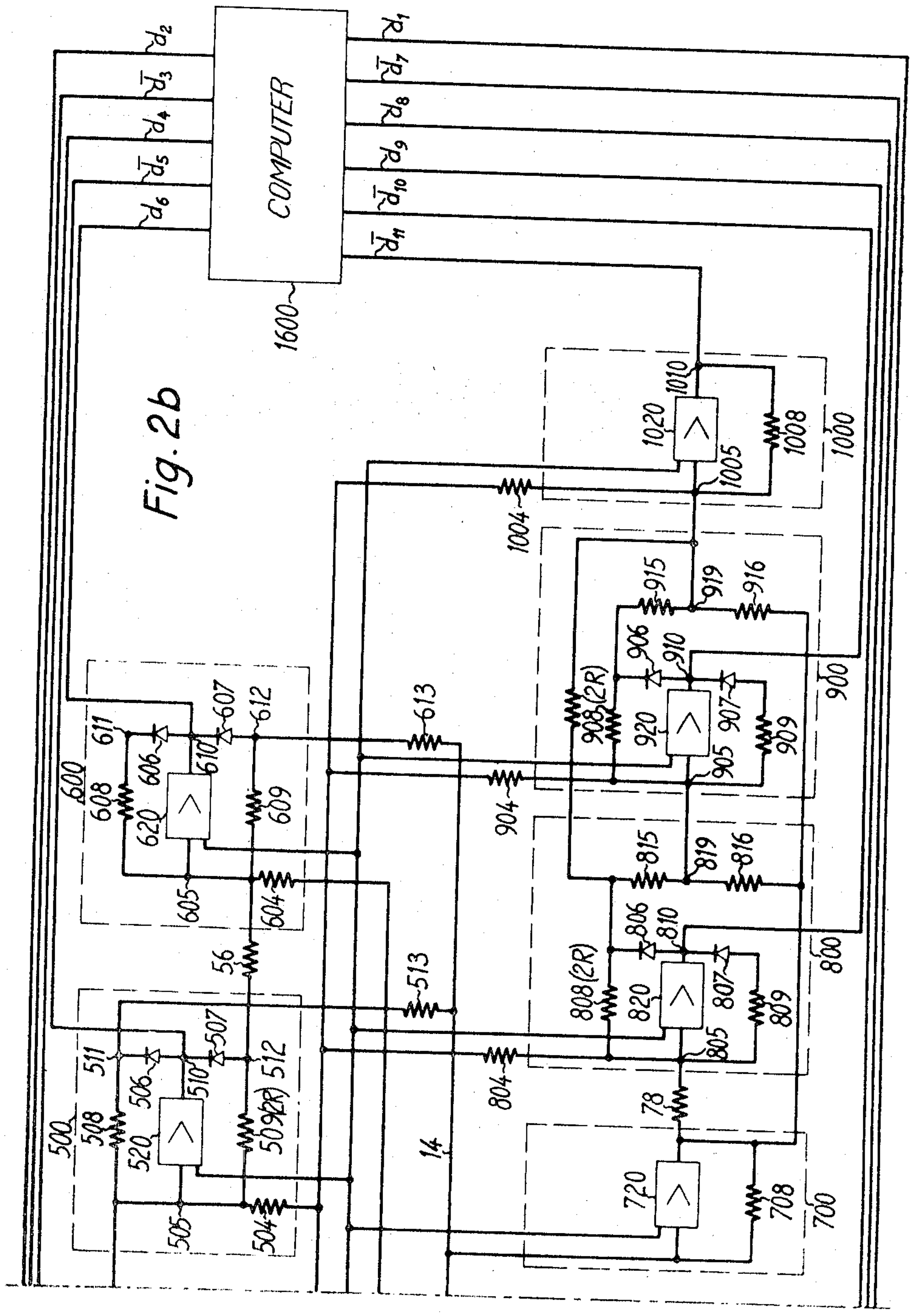

The encoder according to the invention, which is shown in FIG. 2, comprises stages 100, 200, 300, 400, 500, 600, 700, 800, 900, 1000, 1100, 1200, 1300, 1400, 1500. Except for the stages 700, 1000, 1500, which are ordinary amplifiers, all the other stages are translators of the kind shown in FIG. 1. The constituent elements of the various stages have the same reference numbers in FIG. 2 as in FIG. 1 but preceded by a hundreds number which is the same as the hundreds number of the reference number for the particular stage concerned.

Stage 100 is an input stage which delivers to stage 200 a sample, the same always being of the same polarity. In addition to the conventional parts of the elementary translator, stage 100 comprises a chain of two resistances 115, 116 connected between output terminal 111 and input terminal 101. The output of stage 100 is a point 119 common to the two resistances 115, 116. If the input voltage applied between the terminals 101 and 101' is negative and equal to −V, the voltage at output terminal 111 is 2V (the diode 116 is conductive). Since input 205 of stage 200 is always virtually at ground potential and has a high impedance, the voltage applied to input 205 can be considered to be proportional to the sum of the currents which flow through the resistances connected to it. This sum is:

$$2V/R \text{ (through 115)} - V/R \text{ (through 116)} - V_o/R_o \text{ (through 204)}$$

$-V_o$ denoting the potential of bus-bar 3, so that we have $$V/R - V_o/R_0$$

When the input voltage is +V, the voltage at output terminal 111 is 0 and the current applied to input 205 is:

$$V/R \text{ (through 116)} - V_o/R_o \text{ (through 204)}.$$

The same expression is found, and the input signal polarity of stage 200 is the same whatever the input signal polarity of stage 100.

In stages 100, 200, 400, 800, 900, 1400 the resistance 108, 208, 408, 808, 908, 1408 respectively has the value 2R, and in the stages 300, 500, 1200, 1300, the resistance 309, 509, 1209, 1309 respectively has the value 2R. In stage 600 the two negative feedback resistances have the same value as one another.

The biasing current for the stages 200, 300, 500 is taken from a negative bus-bar 3 through the resistances 204, 304, 504 and the biasing current for the stages 400, 600 is derived from the positive bus-line 3' through the resistances 404 and 604.

Outputs 210, 310, 410, 510, 610 deliver the binary digits $d_2$, $d_3$, $d_4$, $d_5$, $d_6$ respectively. Cascading is via resistance 23 from output 211 to input 305, via resistance 34 from output 312 to input 405, via resistance 45 from output 411 to input 505 and via resistance 56 from output 512 to input 605. The interconnections are of course alternately by way of one and the other of the two outputs of each translator. All the interconnection resistances have the same value R. Those outputs of each translator which are not used for cascading i.e., outputs 212, 211, 412, 511, 612 are connected via resistances 213, 313, 413, 513, 613 to an addition rail 14.

The channel of stages 1100, 1200, 1300, 1400, 1500, is for encoding low-value samples - i.e., samples of less than 32 units which are multiplied by 32, then compared with 512 and 256.

Stage 1100 has an operational amplifier 1120 with three negative feedback paths. The first path comprises a biasing source 1116, a diode 1106 and a resistance 1108, the diode conducting from output 1110 towards input 1105. The second path comprises a biasing source 1117, diode 1107 and resistance 1109, the diode 1107 being conductive from input 1105 to output 1110. The third path comprises a rectifier bridge 1115 and a resistance 1118. The rectifier bridge 1115 is energized by currant supplies 1121, 1122 through resistances 1123, 1134. The supplies 1116, 1117 have a voltage V. The sample to be encoded is applied to the input of amplifier 1120 through resistance 1102. When the output voltage is between $-V_1$ and $+V_1$, $V_1$ corresponds to 32 levels and the third branch is operative. When the output voltage is above $V_1$, the first branch is operative, and when the output voltage is below $V_1$ the second branch is operative.

Figure 5:
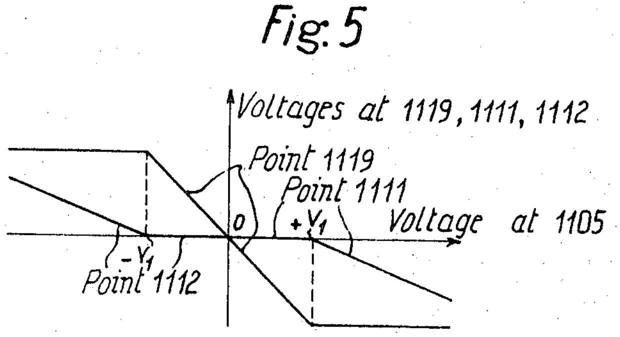
FIG. 5 is a second diagram helping to explain how the encoder operates.

FIG. 5 represents the voltages at the points 1111, 1112 and 1119. The chain of circuits comprising the stages 1200, 1300, 1400, 1500 is energized by the voltage at the point 1119.

The stage 1200 is identical to stage 100 and need not be described. Its function is to ensure that the input signal for stage 1300 is always positive.

The stages 1300 and 1400 are identical to the stages 300 and 400 respectively; they are interconnected by resistance 1314 between output terminal 1312 and input terminal 1405; their input terminals are connected to rail 3' by resistances 1304 and 1404, and their output terminals 1311 and 1412 are connected to the addition rail 14 by resistances 1313 and 1413. Their output terminals 1310, 1410 deliver signals $\bar{d}_7$ and $d_8$ respectively.

Stage 1500 comprises an ordinary unity-gain inverter 1520 whose input terminal 1505 is connected to output terminal 1411 of stage 1400 via resistance 1415 and whose output terminal 1510 is connnected to addition rail 14 by resistance 1513.

Figure 4:
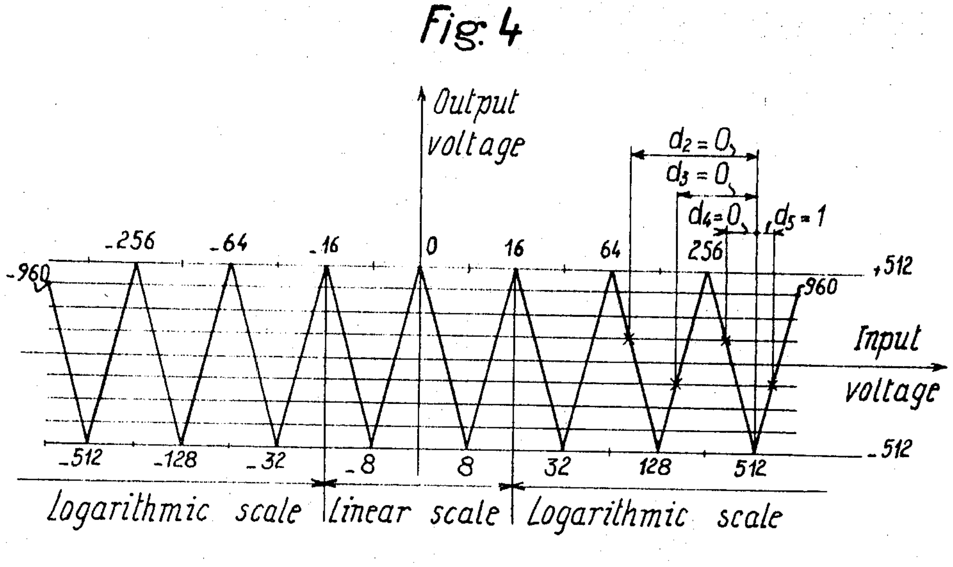
FIG. 4 is a diagram helping to explain how the encoder operates.

FIG. 4 is a graph to illustrate the operation of the nonlinear encoder, disregarding the computer which will be dealt with subsequently. The input voltage is plotted along the abscissa; the scale is linear between 0 and 16 (and between 0 and –16) and logarithmic between 16 and 960 (and between –16 and –960). The voltage 512 is compared with the sample 88, then with twice the sample - i.e., with 176 then with four times the sample - 352 then with eight times the sample – 704. The first three comparisons give $d_2 = d_3 = d_4 = 0$; the fourth gives $d_5 = 1$, and since the 1's and the 's cannot be interlaced, we have :

$$d_6 = d_7 = d_8 = 1$$

The linear encoder comprises the stages 700, 800, 900, 1000. Stage 700 is an addition amplifier whose input is connected to the addition rail 14. Stages 800 and 900 are of the same construction as stage 100. A point 819 common to the two resistances 815 and 816 is connected to input terminal 905. Also, the point common to the resistances 915 and 916 is connected to input terminal 1005. The resistance 816 also performs the function of the resistance 102.

The outputs 810, 910, 1010 deliver the binary digits $d_9$, $\bar{d}_{10}$, $\bar{d}_{11}$ respectively.

The values of the signal-decoding resistances 804, 904, 1004 are as follows : 256 for 804; 256 + 128 = 384 for 904; and 256 + 128 + 64 = 448 for 1004. They are connected to the same negative potential source.

Turning to the previous example, we find that the signal at the input of stage 700 is $(512 - 8 \times 88) = -192$. The following comparisons are made :

on stage 800 : 192 and 256 : $d_9 = 0$ on stage 900 : 2 (256 – 192) + 192 with 304 that is : 320 with 384 : $d_{10} = 0$ on stage 1000 : 2 (384 – 320) + 2 (256 – 192) + 192 with 448 that is : 448 with 448 : $d_{11}$=1 (limit value)

The associated logic circuits deduce from the foregoing the following values of $X$, $Y$ and $Z$:

thus : $X = d_9 = 0$ $$Y = \bar{d}_9 d_{10} + \bar{d}_{10} d_9 = 1$$

$$Z = \bar{Y} d_{11} + Y \bar{d}_{11} = 1$$

Figure 3:
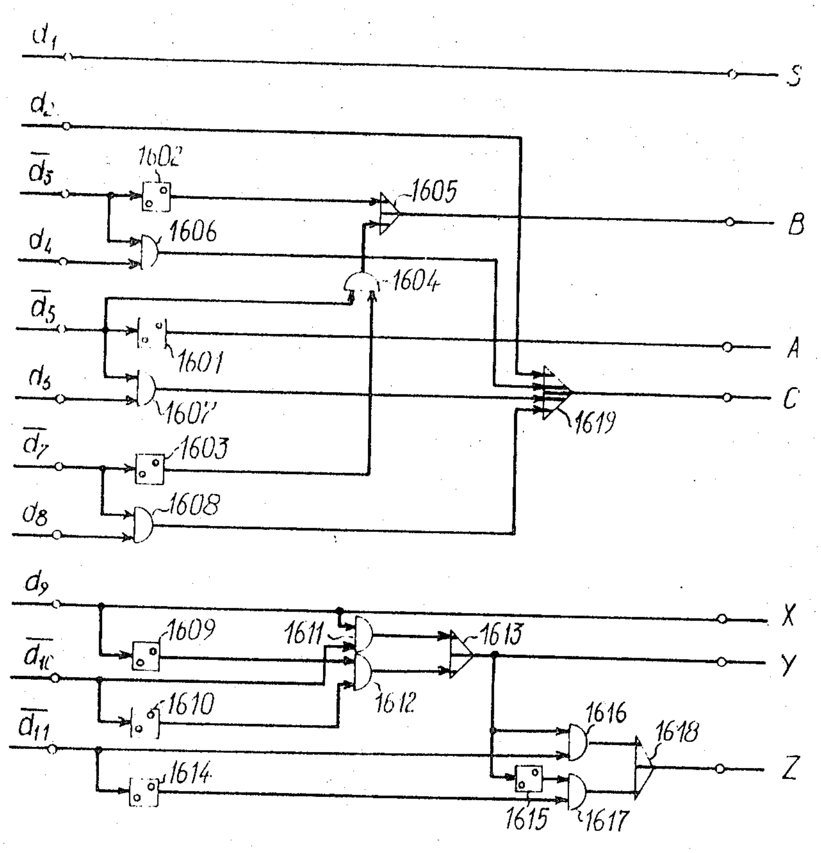
FIG. 3 shows the encoder computer.

FIG. 3 shows the logic circuit 1,600 of FIG. 2 which receives $d_1, d_2, \bar{d}_3, d_4, \bar{d}_5, d_6, \bar{d}_7, d_8, d_9, \bar{d}_{10}$ and $\bar{d}_{11}$ and calculates formulas (3) and (4). S is equal to $d_1$; A is equal to $d_5$; B is obtained by the inverter 1602 which gives $d_3$, by the inverter 1,603 which gives $d_7$, by the AND-gate 1,604 which gives $\bar{d}_5 d_7$, and by OR-gate 1605 which gives $d_3 + d_7 \bar{d}_5$. C is obtained by AND-gates 1,606-1608, giving $\bar{d}_3 d_4$, $d_5 d_6$ and $\bar{d}_7 d_8$ respectively, and by OR-gate 1619, which summates these three products and $d_2$. $X$ is equal to $d_9$; $Y$ is obtained by the inverters 1,609 and 1,610, which deliver $\bar{d}_9$ and $d_{10}$, by AND-gates 1,611 and 1,612, which deliver $d_9 d_{10}$ respectively, and by OR-gate 1,613, which summates these two products. $Z$ is obtained by the inverters 1614 and 1615, which deliver $d_{11}$ and $\bar{Y}$, by AND-gates 1616 and 1617, which deliver $Y\bar{d}_{11}$ and $Y\bar{d}_{11}$, and by OR-gate 1618, which adds these two products.

Figure 6:
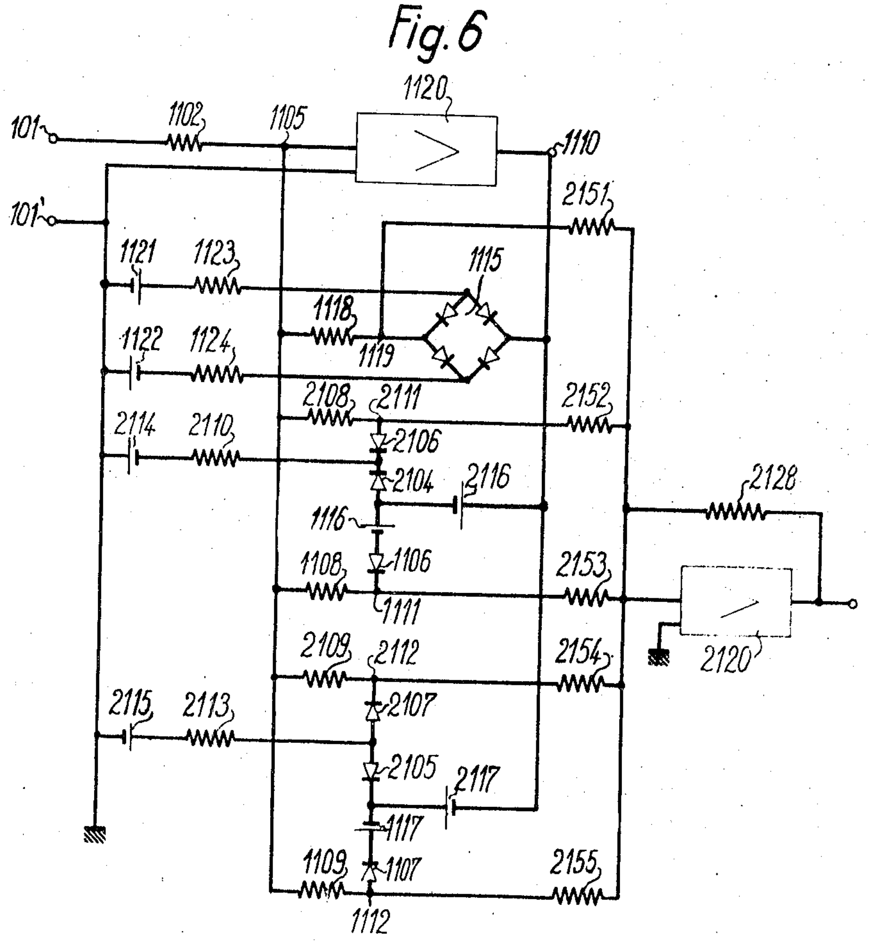
FIGS. 6 and 7 are explanatory diagrams related to a variant of the invention.

Referring now to FIG. 6, which shows a variant of the circuit 1,100, there can be seen the operational amplifier 1,120 and its negative feedback path comprising the rectifier bridge 1115, resistance 1,118, and the rectifier bridge power supply comprising the sources 1121, 1122 and the resistances 1123, 1124. The other two feedback paths are more complex than in the case shown in FIG. 2 and each comprises a respective power supply 2116, 2117 each energizing two paths. One of the paths starting from supply 2116 is merely the channel corresponding to the channel consisting of the supply 1116, diode 1106 and resistance 1108 previously seen in FIG. 2, and one of the paths starting from supply 2117 is merely the path previously seen in FIG. 2 and comprising the supply 1117, diode 1107 and resistance 1109. The other path starting from the supply 2116 comprises diodes 2104, 2106 and a resistance 2108, and the other path starting from supply 2117 comprises diodes 2105, 2107 and a resistance 2109. The common point between the two diodes 2104, 2106 is grounded via resistance 2110 and power supply 2114. The common point to the two diodes 2105, 2107 is grounded via resistance 2113 and power supply 2115. The signals at the points 1119, 1111, 2111, 1112, 2112 are summated by adding resistances 2151–2155, all of the same value, and applied to the input of amplifier 2120.

In normal conditions a current flows through the path formed by the supply 2115, resistance 2113, diode 2107, resistance 2109, resistance 2109, diode 2106, resistance 2110 and supply 2114. The supplies 2116, 2117 are identical so that the diodes 2104, 2105 are nonconductive.

For low-amplitude signals the stage shown in FIG. 6 behaves similarly to the stage 1100; when the output signal increases, for instance, in a positive-going sense, and exceeds $V_{1max}/4$, diode 2104 passes a current which returns to supply 2114 through resistance 2110 and which alters the current flowing through resistance 2108. Because of this variation of the current flowing therethrough, the potential of the point 2111 varies in proportion to the voltage applied to input 101. The variation of the potential of the point 2111 (part *b* of the diagram in FIG. 7) is also proportional to the relationship $R_{2108}/R_{1102}$. If the potential of output terminal 1110 continues to rise and exceeds $V_{1max}/2$, the current output by source 2114 is completely absorbed by diode 2104 and the resistance 2108 is inoperative, being replaced by resistance 1108 since the voltage at terminal 110 is high enough to make conductive the diode 1106 previously kept nonconductive by the supply 1116. The point 1111 rises to a potential determined by the current flowing through the resistance 1108 (part *c* of the diagram in FIG. 7).

As the voltage at output terminal 1110 increases, the various variations of the points 1119, 2111 and 1111 are amplified consecutively in the amplifier 2120, the resistances 2151, 2152, 2153 being respectively and consecutively connected thereto because of the current variations which they are required to transmit. The gain of amplifier 2120 is adjusted by resistance 2128.

Figure 7:
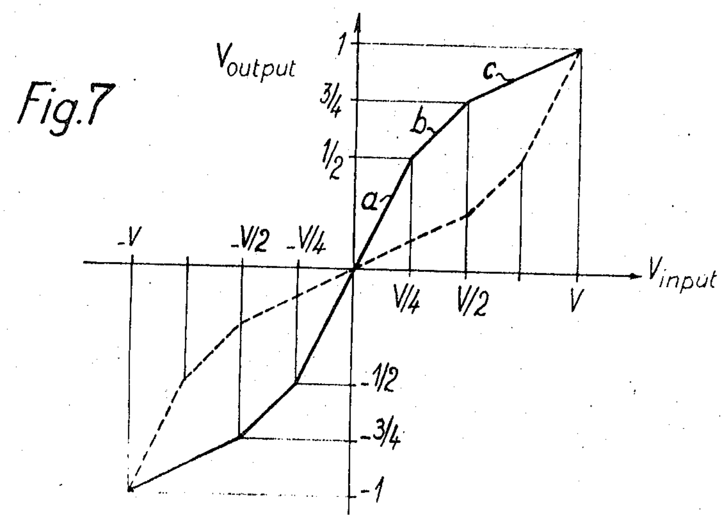

Negative variations of the potential of point 1110 are treated symmetrically by like circuits of the other branches and the transfer characteristic of a system of this kind is given in FIG. 7. Such characteristic takes the form of a curve consisting of 5 line-segments whose slopes are determined by the ratios of the resistances 1118, 2108, 1108, 2109 and 1109 to the resistance 1102. In the present case the ratio of the consecutive slopes is 1 : 2 but this value is not restrictive and can be varied just by changing a resistance.

The number of line-segments is not limitative either; if circuits similar to those embodied by the integers 2108, 2106, 2104 and 2109, 2107 and 2105 and the supplies 2114, 2115 and the resistances 2110, 2113 are added to the circuit arrangement shown in FIG. 6, two further segments can be provided. This feature forms a compressor which can be associated with an encoder of the kind constructed from the stages 800, 900, 1000 of FIG. 2 with an increased number of stages or of any other known kind of linear encoder.

This circuit can also be associated with a known kind of encoder to act as an expander. In this event, the values of the resistances 1118, 2108, 2109 and 1109 and of the power supplies 1020, 1030, 1021, 1031 must be modified to give a characteristic which is the reverse of the characteristic shown in FIG. 7 and which is shown therein in broken lines.

I claim:

1. A device for converting analog signal voltage samples into PCM signals with amplitude compression, comprising:
   - means for successively comparing with a predetermined reference voltage each of said samples and the products thereof by increasing powers of two and for producing from the comparison an encoded binary sequence consisting of binary digits having one predetermined of two possible signalling conditions each time said voltage sample and products are below said reference voltage;
   - means for forming remainder signal whose amplitude is equal to the difference obtained by subtracting said reference voltage from the lowest of said products which is larger than said reference voltage;
   - a linear encoder for linearity encoding said remainder signal and translating it into a first PCM coded group;

- a computer for translating said sequence into a second PCM coded group;
   - and means for transmitting the assembly of said first and second coded groups;
   - said device being further characterized in that:
   - said successive comparison means and remainder signal forming means consist of a plurality of cascaded circuits, each of which comprises a differential amplifier having a first and a second negative feedback path, said first negative feedback path including a first diode oriented to conduct from the output to the input of said amplifier and series-connected at a first common point with a first resistor, said second negative feedback path including a second diode oriented to conduct from the input to the output of said amplifier and series-connected at a second common point with a second resistor having either of two resistance values equal to half and twice that of said first resistor according to the even or odd rank of said amplifier in said plurality of cascaded circuits whereby said amplifier delivers at one or the other of said common points a voltage equal to either of said reference voltage less the input voltage of said amplifier and twice said reference voltage less the input voltage of said amplifier according to the polarity of latter said input voltage; in that connection means are provided for differentially applying said sample and reference voltages to the input of that of said amplifiers which belongs to the first of said cascaded circuits, together with further connection means connecting one of said common points in each one of said cascaded circuits with the input of the amplifier included in the following one of said cascaded circuits, and with still further connection means for connecting the other of said common points in latter said one of said circuits to said linear encoder; and in that each of said amplifiers in said cascaded circuits from the second one on includes differential input means fed on one hand from the preceding one of said circuits and on the other hand from said reference voltage.

2. A device as claimed in claim 1 in which at least part of said further connection means include a voltage divider including two series-connected resistors.

3. A device as claimed in claim 1, in which said amplifiers are operational amplifiers.

* * * * *